United States Patent
Brockmann et al.

(10) Patent No.: US 10,999,790 B1
(45) Date of Patent: May 4, 2021

(54) SYSTEMS AND METHODS FOR SELECTIVELY CONNECTING TO DISTRIBUTED UNITS ("DUS") IN A WIRELESS NETWORK BASED ON RATES OF CHANGE OF SIGNAL STRENGTHS OF CANDIDATE DUS

(71) Applicant: Verizon Patent and Licensing Inc., Arlington, VA (US)

(72) Inventors: Peter Brockmann, Marlborough, MA (US); Soumyadeep Pan, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/834,638

(22) Filed: Mar. 30, 2020

(51) Int. Cl.
*H04W 48/20* (2009.01)
*H04B 17/318* (2015.01)
*H04W 48/16* (2009.01)
*H04W 88/08* (2009.01)

(52) U.S. Cl.
CPC .......... *H04W 48/20* (2013.01); *H04B 17/318* (2015.01); *H04W 48/16* (2013.01); *H04W 88/085* (2013.01)

(58) Field of Classification Search
CPC ............... H04B 17/318; H04B 17/327; H04W 48/16–20; H04W 36/14; H04W 36/24; H04W 36/245; H04W 36/28; H04W 36/30; H04W 36/32; H04W 36/34; H04W 36/36; H04W 88/085
See application file for complete search history.

(56) References Cited

U.S. PATENT DOCUMENTS

| | | | | |
|---|---|---|---|---|
| 6,049,715 A * | 4/2000 | Willhoff | ................ | H04W 24/00 455/226.2 |
| 2008/0108353 A1* | 5/2008 | Lee | .................... | H04W 36/0061 455/437 |
| 2013/0272264 A1* | 10/2013 | Ning | ...................... | H04W 36/24 370/331 |
| 2019/0037468 A1* | 1/2019 | Bongaarts | ............. | H04W 36/32 |

* cited by examiner

*Primary Examiner* — Ronald Eisner (57) ABSTRACT

A system described herein may provide for the selection of a cell of a wireless telecommunications network to which a User Equipment ("UE") should connect. The UE may receive radio frequency ("RF") signals from a group of cells (e.g., implemented by Radio Units ("RUs")) of a radio access network ("RAN"), and may determine signal strengths or measures of channel quality associated with the RF signals. For example, the UE may determine a rate of change of signal strengths over time associated with each cell, a differential rate of change, or some other value, and may select the cell based on the respective rates of change. For example, the UE may select a particular cell which exhibits the lowest differential rate of change of signal strengths over time. A particular cell may be implemented, for example, by a mobile RU mounted on a vehicle that maintains relatively close proximity to UE.

20 Claims, 8 Drawing Sheets

SYSTEMS AND METHODS FOR SELECTIVELY CONNECTING TO DISTRIBUTED UNITS ("DUS") IN A WIRELESS NETWORK BASED ON RATES OF CHANGE OF SIGNAL STRENGTHS OF CANDIDATE DUS

BACKGROUND

Wireless telecommunication networks provide network connectivity to user equipment ("UE"), such as mobile telephones or other wireless communication devices, via a radio access network ("RAN"). A RAN may include multiple radios, which may be distributed geographically, through which UEs may connect.

DETAILED DESCRIPTION OF THE PREFERRED EMBODIMENTS

The following detailed description refers to the accompanying drawings. The same reference numbers in different drawings may identify the same or similar elements.

Wireless networks may include RANs that include geographically distributed RUs, such that radio frequency ("RF") coverage associated with the RANs may be optimally provided in diverse geographic regions. For example, a Fifth Generation ("5G") RAN, or some other type of RAN, may include RUs that provide relatively high-throughput and/or low-latency services. RUs may be communicatively coupled to Multi-Access Edge Computing ("MEC") systems, which may provide services to UEs that are connected to associated RUs. For example, MEC systems (referred to herein simply as "MECs") may provide services related to autonomous automobile control (e.g., for "self-driving cars"), autonomous drone control, augmented reality systems, real-time emergency services, and/or other latency- or throughput-intensive services.

Figure 1:
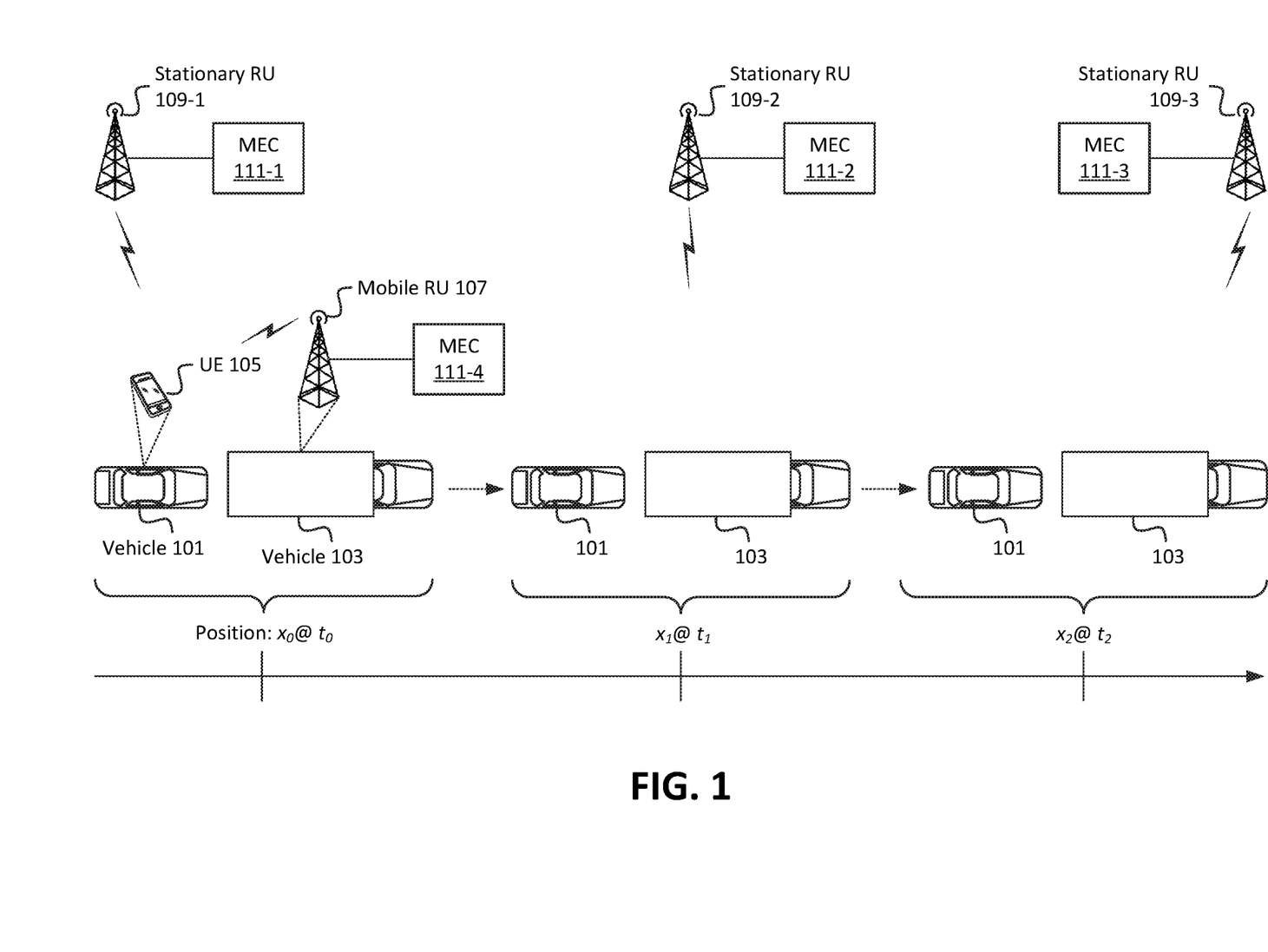
FIG. 1 illustrates an example overview of one or more embodiments described herein, in which a mobile radio unit ("MRU") and one or more stationary radio units ("SRUs") may be available for connection to a UE.

Embodiments described herein provide for the deployment of, and selective connection to, mobile RUs ("MRUs"). For example, as shown in FIG. 1, one or more example vehicles 101 and 103 may be traveling (e.g., along a roadway), such that vehicles 101 and 103 are located at a first position $x_0$ at a first time $t_0$, at a second position $x_1$ at a second time $t_1$, and at a third position $x_2$ at a third time $t_2$. In this example, vehicles 101 and 103 may generally maintain approximate proximity to one another. For example, vehicles 101 and 103 may be traveling along the same roadway for the duration of the period beginning at time $t_0$ and ending at time $t_2$ (and potentially before and/or after such period).

As shown, a particular ULE 105 may be located within vehicle 101. For example, UE 105 may be a mobile telephone, a tablet computer, etc. used by a passenger located within vehicle 101. As another example, UE 105 may be a mobile telephone, tablet computer, etc. that is communicatively coupled to an in-car navigation and/or infotainment system integrated within vehicle 101. As yet another example, UE 105 may itself be an in-car navigation and/or infotainment system integrated within vehicle 101, and/or may be a component of such a system.

Vehicle 103 may include MRU 107. For example, vehicle 103 may include one or more mounted antennas, controllers, etc. that may provide network connectivity to UE 105. For example, vehicle 103 may be one of a group of RUs associated with a RAN of a wireless telecommunications network. The group of RUs associated with the RAN may also include stationary RUs ("SRUs") 109-1 through 109-3 (sometimes referred to herein individually as "SRU 109," or collectively as "SRUs 109"). As shown, while MRU 107 may be mounted to vehicle 103 (and may therefore be considered "mobile"), SRUs 109 may be mounted to towers, buildings, or other structures (and may therefore be considered "stationary"). In this example, UE 105 may be closer to SRU 109-1 than SRUs 109-2 and 109-3 at time $t_0$, may be closer to SRU 109-2 than SRUs 109-1 and 109-3 at time $t_1$, and may be closer to SRU 109-3 than SRUs 109-1 and 109-2 at time $t_2$.

As discussed below, MRU 107 may be associated with a wireless "fronthaul" network (e.g., a Common Public Radio Interface ("CPRI"), an enhanced CPRI ("eCPRI") network, an Open RAN ("ORAN") network, or the like), in which traffic may be provided to and/or from a core network from and/or to UE 105 via a wireless interface. On the other hand, SRUs 109 may be associated with a wired fronthaul network (e.g., via fiber or other suitable wired interfaces). Additionally, or alternatively, one or more SRUs 109 may be associated with a wireless fronthaul network.

As further shown, MRU 107 and each SRU 109 may be associated with a particular MEC 111. For example, SRUs 109-1 through 109-3 may be respectively associated with MECs 111-1 through 111-3, while MRU 107 may be associated with MEC 111-4. For example, MECs 111-1 through 111-3 may be implemented by hardware that is geographically proximate to respective SRUs 109-1 through 109-4, while MEC 111-4 may be implemented by hardware that is physically located on vehicle 103. Thus, in some situations, when connected to MRU 107, UE 105 may communicate with and/or receive services from MEC 111-4. Similarly, when connected to SRU 109-1, UE 105 may communicate with and/or receive services from MEC 111-1, and so on.

In some embodiments, vehicle 103 may be a truck or other type of vehicle that is suitable to carry MRU 107 and/or MEC 111-4. In some embodiments, vehicle 103 may include MRU 107 and not MEC 111-4. In some embodiments, some or all of MRU 107 may be mounted on a roof portion of MRU 107, on top of a trailer that is hitched to MRU 107, or some other mounting location that is selected to provide optimal RF coverage.

As noted above, UE 105 may be closer to different SRUs 109 at different times. For example, at time $t_0$, UE 105 may be relatively close to SRU 109-1. Accordingly, at time $t_0$, a measure of signal strength and/or channel quality (e.g., Received Signal Strength Indicator ("RSSI"), Signal-to-Interference-and-Noise-Ratio ("SINR"), Reference Signal Receive Power ("RSRP"), Channel Quality Indicator ("CQI"), or the like) between UE 105 and SRU 109-1 may be relatively high. At time $t_1$, the measure of signal strength and/or channel quality between UE 105 and SRU 109-1 may be relatively lower (e.g., as vehicle 101, carrying UE 105, has moved away from SRU 109-1), and this measure may be even lower at time $t_2$. Thus, in situations where UE 105 is connected to SRU 109-1 (e.g., receiving services from MEC 111-1), UE 105 may experience connectivity issues when moving to positions $x_1$ or $x_2$ (e.g., at times $t_1$ or $t_2$, respectively), and may receive resultingly degraded service. Further, UE 105 may be handed over to SRU 109-2 and/or SRU 109-3, with which UE 105 may have a better connection, but the handover process may introduce latency or may otherwise impact performance or connectivity.

For example, assume that UE 105 is, or is communicatively coupled to, an autonomous driving system of vehicle 101. Further assume that each MEC 111 provides services related to autonomous driving. For example, MECs 111 may receive image or video data from one or more cameras associated with vehicle 101 (e.g., from UE 105, via a respective RU), may perform computation-intensive image processing, generate vehicle control data (e.g., control data related to steering systems, braking systems, acceleration systems, or the like, of vehicle 101), and provide the vehicle control data to UE 105. UE 105 may use such data to control one or more systems of vehicle 101, such as steering, braking, acceleration, etc. In some situations, losing connectivity to any of MECs 111 may invoke a requirement for driver involvement, may cause loss of control of vehicle 101, or yield other unsafe results.

In contrast, if UE 105 were connected to MRU 107, UE 105 may receive relatively steady connectivity at positions $x_0$, $x_1$, and $x_2$ (e.g., at times $t_0$, $t_1$, and $t_2$, respectively). For example, when moving from position $x_0$ to positions $x_1$ or $x_2$, UE 105 may not need to be handed over to another RU, as UE 105 may remain within connection range of MRU 107 as vehicles 101 and 103 travel in relative proximity to one another. As such, the potential loss of connectivity to one or more MECs 111 may be minimized or avoided.

In some situations, even when UE 105 and MRU 107 are relatively close to one another (e.g., as vehicles 101 and 103 in relative proximity), UE 105 may connect to one of SRUs 109 due to one or more factors. For example, signal or channel quality between UE 105 and SRU 109-1 may temporarily be relatively higher than signal or channel quality between UE 105 and MRU 107 (e.g., as vehicle 101 passes by a physical structure containing SRU 109-1), and UE 105 may connect to SRU 109-1 instead of to MRU 107 as part of a cell selection or reselection procedure based on the temporarily higher signal quality between UE 105 and SRU 109-1. However, as mentioned above, even in situations where signal quality between UE 105 and SRU 109-1 is initially higher than signal quality between UE 105 and MRU 107, the transient nature of UE 105 (e.g., located within moving vehicle 101) may give rise to the situations described above. In some situations, UE 105 may connect to SRU 109-1 in lieu of MRU 107 when, for example, UE 105 detects the presence or availability of SRU 109-1 before UE 105 detects the presence or availability of MRU 107 (e.g., during a cell scanning procedure).

Embodiments described herein provide for the intelligent selection, by a UE, of a particular cell (e.g., particular RU, such as a MRU) out of a set of candidate cells of a RAN for connection by the UE, based on one or more factors. In some embodiments, the one or more factors may include the rate of change of signal quality between the UE and the candidate cells. In some embodiments, the one or more factors may additionally, or alternatively, include a comparison of the location of the UE to dynamically tracked locations of MRUs associated with the RAN. In some embodiments, the one or more factors may include a speed of the UE, a comparison of the location of the UE to known locations of roads, highways, or other factors.

Figure 2:
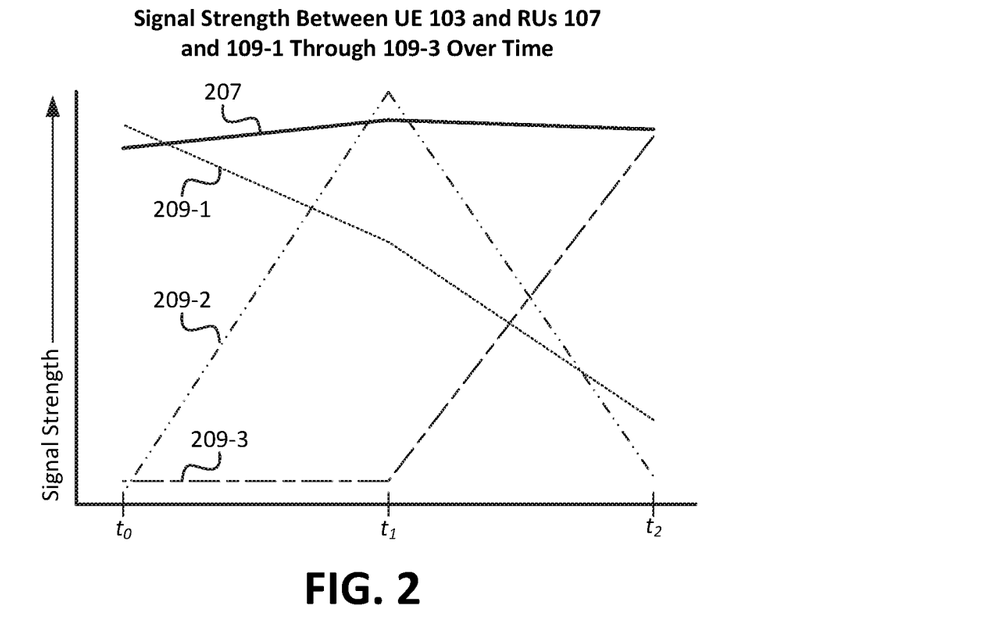
FIG. 2 illustrates measures of signal strength between the UE shown in FIG. 1 and the various radio units ("RUs") shown in FIG. 1, including the MRU and the one or more SRUs.
Figure 3:
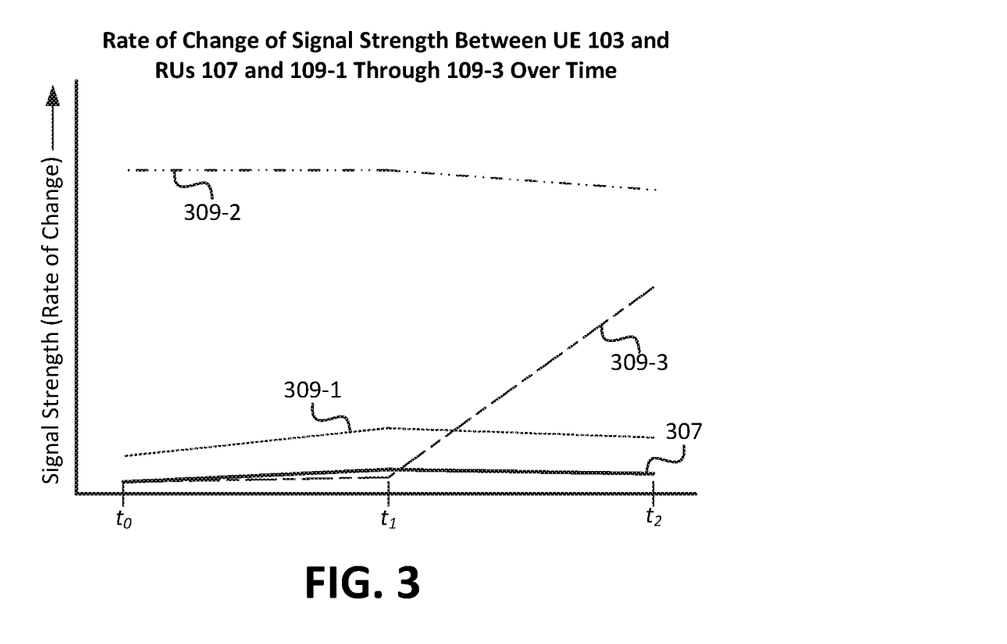
FIG. 3 illustrates rates of change of the signal strengths between the UE and the various RUs.
Figure 4:
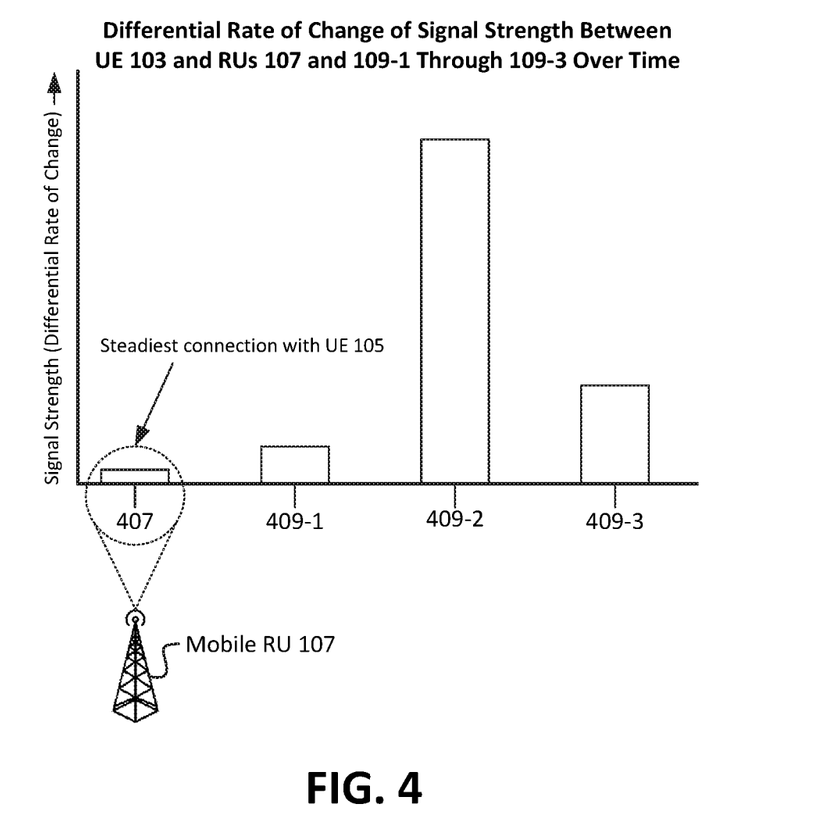
FIG. 4 illustrates rates of change over time of the signal strengths between the UE and the various RUs.

For example, FIG. 2 illustrates an example graph that depicts measures of signal strength (e.g., RSSI, RSRP, SINR, etc.) between UE 105 and each of the RUs depicted in FIG. 1 (i.e., MRU 107 and SRUs 109). In this figure, the line representing the signal strength for a particular RU is numbered similarly to the RU which the line represents. For example, line 207 represents the signal strength for MRU 107, line 209-1 represents the signal strength for SRU 109-1, and so on. FIGS. 3 and 4 are also numbered in a similar manner. While actual values are not depicted in FIG. 2 for signal strength, signal strength may be measured in terms of decibels ("dBm"), CQI values, raw values of latency or throughput measurements, scores derived from one or more of the above or other signal strength measures, or in some other suitable manner.

As depicted by line 207, the signal strength between UE 105 and MRU 107 may be relatively high at times $t_0$, $t_1$, and $t_2$. However, at certain times, signal strengths between UE and other RUs may be higher than the signal strength between UE 105 and MRU 107. For example, at time $t_0$, as denoted by line 209-1, the signal strength between UE 105 and SRU 109-1 may be higher than the signal strength between UE 105 and MRU 107. However, as similarly described above, and as further denoted by line 209-1, the signal strength between UE 105 and MRU 107 at times $t_1$ and $t_2$ may be lower than the signal strength between UE 105 and MRU 107 at those times. Similarly, the signal strengths between UE 105 and each of SRU 109-2 and SRU 109-3 may also be higher or lower at times than the signal strength between UE 101 and MRU 107.

As further shown in FIG. 2, and as reflected in the graph of FIG. 3, the signal strength associated with MRU 107 may be more steady (e.g., exhibit less variance) than the signal strengths associated with SRUs 109. For example, FIG. 3 illustrates the rate of change at times $t_0$, $t_1$, and $t_2$ for the signal strengths shown in FIG. 2 (i.e., associated with MRU 107 and SRUs 109). For the sake of example, assume that signal strength data points exist before time $t_0$ and/or after time $t_2$ (as the rate of change at time $t_0$ on the graph may be partially based on a preceding measure of signal strength, and/or the rate of change at time $t_2$ may be partially based on a succeeding measure of signal strength).

In this example, rates of change are reflected as absolute values. For example, line 209-2 in FIG. 2 increases relatively sharply between times $t_0$ and $t_1$, and declines relatively sharply between times $t_1$ and $t_2$. These sharp changes may be reflected by the relatively high values of line 309-2 at times $t_1$ and $t_2$. That is, for example, the relatively high value of line 309-2 at time $t_1$ may reflect the relatively sharp increase in values of line 209-2 between times $t_0$ and $t_1$, and the relatively high value of line 309-2 at time t₂ may reflect the relatively sharp decline in values of line 209-2 between times t₁ and t₂.

Similarly, the relatively low values of line 307 may reflect the relatively low amounts of change of the values of line 207. For example, even though the values of line 207 are relatively high (e.g., indicating relatively high levels of signal strength), the values of corresponding line 307 (reflecting the rates of change of line 207) are relatively low.

FIG. 4 illustrates the differential rate of change of signal strength associated with MRU 107 and SRUs 109-1 through 109-3 (e.g., as depicted in FIG. 3) over time. For example, bars 407 and 409-1 through 409-3 may be averages, medians, minimums, maximums, and/or other values derived from the rates of change (shown in FIG. 3) over a period of time. In some embodiments, bars 407 and 409-1 through 409-3 may be based on calculating an integral of the values shown in FIG. 3 (e.g., bar 407 may be based on an integral of the values represented by line 307, and so on). For the sake of explanation, assume that the values denoted by bars 407 and 409-1 through 409-3 correspond to average values, between times t₀ and t₂, of the values denoted by lines 307 and 309-1 through 309-3, respectively.

As shown, bar 407 may have the lowest value, and bar 409-2 may have the highest value. For example, the relatively lowest value of line 407 may reflect the low average values of line 307, and the relatively highest value of 409-2 may reflect the relatively high average values of line 309-2. In other words, the relatively lowest value of line 407 may indicate that MRU 107 has the steadiest connection with UE 105 over this time period, and the relatively highest value of line 409-2 may indicate that SRU 109-2 has the most sporadic connection with UE 105 during the same time period.

As provided herein, UE 105 may perform a scanning procedure (e.g., a cell selection or reselection procedure), identify the presence of multiple candidate RUs, and select a particular one of the RUs based on identifying an RU with which UE 105 has the steadiest connection over time. As discussed above, the steadiest connection may be determined based on which one of the candidate RUs has a lowest average (or other suitable derived value) rate of change of signal strength with UE 105 overtime.

Figure 5:
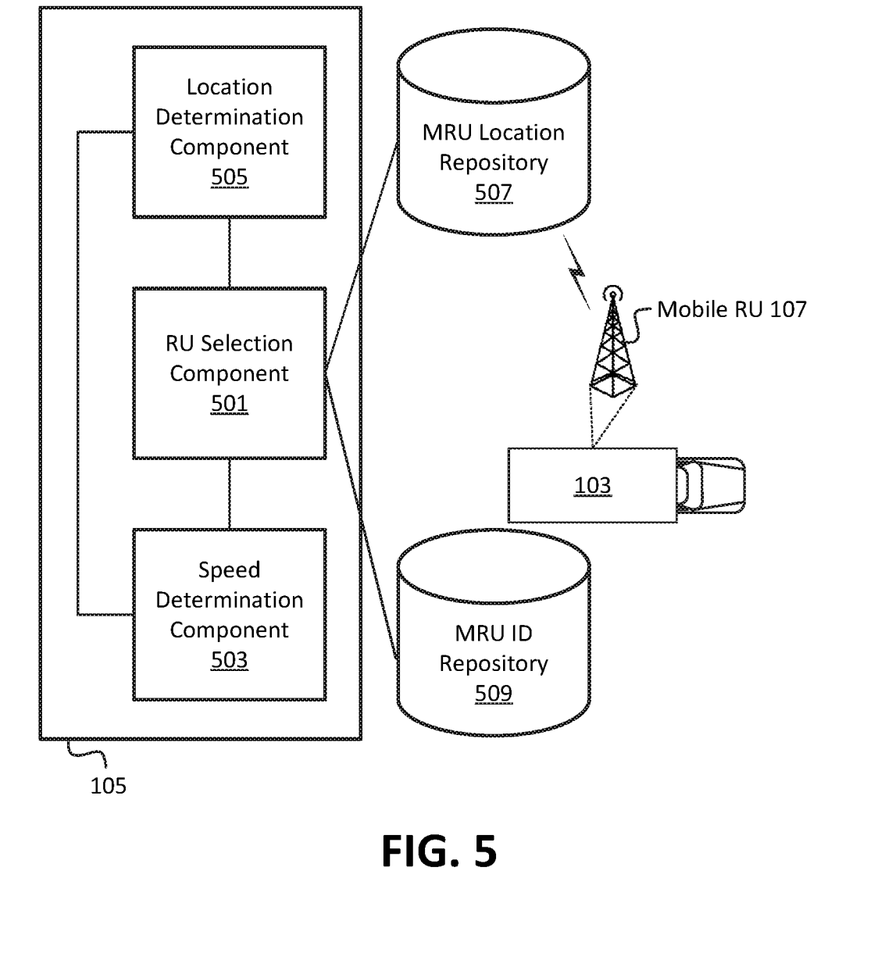
FIG. 5 illustrates example functional components of a UE, in accordance with some embodiments described herein.

FIG. 5 illustrates example functional components of UE 105, in accordance with some embodiments. As shown, UE 105 may include RU Selection Component 501, Speed Determination Component 503, and Location Determination Component 505. In some embodiments, UE 105 may include, and/or may be communicatively coupled with (e.g., via a wireless network), MRU Location Repository 507. For the sake of explanation, only some components of example UE 101 are described with respect to FIG. 5. In some embodiments, UE 105 may include additional, fewer, different, and/or differently arranged components.

RU Selection Component 501 may select a particular cell of a wireless network for UE 105 to connect to. For example, RU Selection Component 501 may include, or may be communicatively coupled to, RF circuitry associated with UE 105, via which RU Selection Component 501 may receive signal strength measurement information between UE 105 and one or more cells of a RAN. For example, as referred to herein, a "cell" may correspond to a particular RU, such as MRU 107 or SRU 109. In some embodiments, the term "cell" may refer to a set of particular set of carriers (e.g., frequency bands or sub-bands) implemented by a RU, a evolved Node B ("eNB"), a Next Generation Node B ("gNB"), or some other type of base station or access point.

As similarly discussed above, based on these signal strength or quality measurements, over time (e.g., calculated differential signal strengths over time), between UE 105 and one or more cells (such as one or more MRUs 107 and/or one or more SRUs 109), RU Selection Component 501 may select a particular cell, and cause UE 105 to connect to the particular cell. For example, RU Selection Component 501 may determine that UE 105 is in range of MRU 107, SRU 109-1, SRU 109-2, and SRU 109-3 within a given time window based on receiving one or more signal strength measurements between UE 105 and these RUs. RU Selection Component 501 may further determine that the signal strength between UE 105 and MRU 107 is the steadiest of the signal strengths between UE 105 and the set of RUs. For example, as similarly described above, the differential rate of change over time (e.g., the average rate over time) of signal strengths between UE 105 and MRU 107 may be the lowest differential rate of change over time of the signal strengths between UE 105 and the set of RUs.

In some embodiments, RU Selection Component 501 may select a particular RU based on the above operations, and one or more other factors. For example, RU Selection Component 501 may receive speed information from Speed Determination Component 503. Speed Determination Component 503 may include one or more sensors, logic, or other hardware circuitry that calculate a speed of UE 105. For example, Speed Determination Component 503 may include one or more accelerometers, gyroscopes, and/or other devices that are able to detect motion. For example, Speed Determination Component 503 may determine a speed of UE 101 based on location information (e.g., differences in geographic location over time) provided by Location Determination Component 505. Location Determination Component 505 may, for example, include Global Positioning System ("GPS") circuitry, and/or may receive location information of UE 105 from a wireless network.

In some embodiments, RU Selection Component 501 may determine whether to select a cell based on differential rates of change of signal strengths over time (e.g., as discussed above) based on a current speed of UE 105. For example, if UE 105 is moving above a threshold speed (e.g., 15 meters per second), this may indicate that UE 105 is likely located within a vehicle, and cells for which a signal strength is relatively steady over time may correspond to a particular MRU 107. In such situations (e.g., where the speed of UE 105 is above a threshold speed), RU Selection Component 501 may determine that RU Selection Component 501 should select a cell based on differential rate of change of signal strength over time. Thus, when selecting cells according to this methodology, RU Selection Component 501 may forgo choosing cells with a relatively higher signal strength at some times in favor of cells that have a relatively steady signal strength. As discussed above, the former situation may occur when UE 105 is located in a vehicle that passes SRU 109, while the latter situation may occur when UE 105 is located in a vehicle that is traveling proximate to MRU 107 (e.g., vehicle 101 traveling proximate to vehicle 103).

If, on the other hand, UE 105 is not moving above the threshold speed, RU Selection Component 501 may forgo selecting a cell based on differential rates of change of signal strengths over time. For example, RU Selection Component 501 may select a first cell based on detecting that the cell has a higher signal strength with UE 105 at some times, or has a higher average signal strength with UE 105, than a second cell that has a relatively more steady, but lower, signal strength with UE 105. For example, UE 105 may be stationary, and may be in communication range of these two example cells. Although the second cell may have a steadier connection, the connection with the first cell may provide better performance. Further, since UE 105 is stationary (or is moving relatively slowly), concerns related to potential handovers between cells may be less of a factor than if UE 105 were moving. Thus, the cell with the higher signal strength may be selected in this situation, in favor of the cell with the steadier connection with UE 105.

In some embodiments, RU Selection Component 501 may receive location information, associated with UE 105, from Location Determination Component 505, and may use the location information to determine whether to select a cell based on the differential rate of change over time of signal strength, and/or based on other factors. For example, assume that RU Selection Component 501 receives location information indicating that UE 105 is located at a location that corresponds to a roadway. In this situation, RU Selection Component 501 may determine that RU Selection Component 501 should select a cell based on the differential rate of change over time of signal strength between UE 105 and one or more cells, as discussed above. Assume, on the other hand, that RU Selection Component 501 receives location information that UE 105 is not located at a location that corresponds to a roadway (e.g., a location that corresponds to a building, a park, a sports arena, a residence, etc.). In this situation, RU Selection Component 501 may determine that RU Selection Component 501 should forgo selecting a cell based on the differential rate of change over time of signal strength between UE 105 and one or more cells (e.g., may select the cell based on one or more other factors).

In some embodiments, RU Selection Component 501 may receive (from MRU Location Repository 507) location information associated with one or more MRUs 107. For example, MRU 107, and/or one or more other devices or systems associated with vehicle 103, may provide (e.g., on an ongoing basis, a real-time basis, a near-real-time basis, etc.) location information associated with MRU 107 and/or vehicle 103 to MRU Location Repository 507. RU Selection Component 501 may determine whether UE 105 is within a threshold distance of one or more MRUs 107. If UE 105 is within the threshold distance of one or more MRUs 107, RU Selection Component 501 may select a cell for UE 105 based on the differential rate of change over time of signal strength between UE 105 and one or more cells, as discussed above. If, on the other hand, UE 105 is not located within the threshold distance of one or more MRUs 107, then UE 105 may forgo selecting a cell based on the differential rate of change over time of signal strength between UE 105 and one or more cells, as discussed above.

In some embodiments, RU Selection Component 501 may receive (e.g., from MRU Identifier ("ID") Repository 509) information regarding one or more identifiers (e.g., RU identifiers, cell identifiers, and/or other suitable identifiers) of one or more MRUs 107. In some embodiments, one or more pilot signals (e.g., based on which UE 105 may identify the presence of MRU 107, timing information, and/or other suitable connection-related information) broadcasted by MRU 107 may include an identifier associated with MRU 107. RU Selection Component 501 may determine whether one or more cells in range of UE 105 (e.g., based on received pilot signals) were received in conjunction with an identifier of a particular MRU 107 for which an identifier was received from MRU ID Repository 509. In other words, RU Selection Component 501 may determine if UE 105 is in communication range of a particular MRU 107. If RU Selection Component 501 determines that UE 105 is communication range of a particular MRU 107, RU Selection Component 501 may perform a cell selection (or reselection) procedure based on the differential rate of change over time of signal strength between UE 105 and one or more cells, as described above. If, on the other hand, RU Selection Component 501 determines that UE 105 is not in communication range of a particular MRU 107 (e.g., as indicated by information from MRU ID Repository 509), then UE 105 may perform a cell selection (or reselection) using some other methodology (e.g., not based on differential rate of change over time of signal strengths between UE 105 and candidate RUs).

Thus, as described above, one or more factors may be used by RU Selection Component 501 to determine whether to select a cell based on rate of change of signal strengths (e.g., based on differential rates of change of signal strengths) between UE 105 and one or more candidate RUs. Generally speaking, if UE 105 is moving, is located on a roadway, is located near a particular MRU 107, and/or has detected the presence of a particular MRU 107, then UE 105 may use differential rate of change over time of signal strengths between UE 105 and the one or more candidate RUs to select a particular one of the candidate RUs for connection. Otherwise, UE 105 may use one or more other methodologies (e.g., first cell detected, cell with highest signal quality at a given time or time window, etc.) to select a candidate RU for connection.

Figure 6:
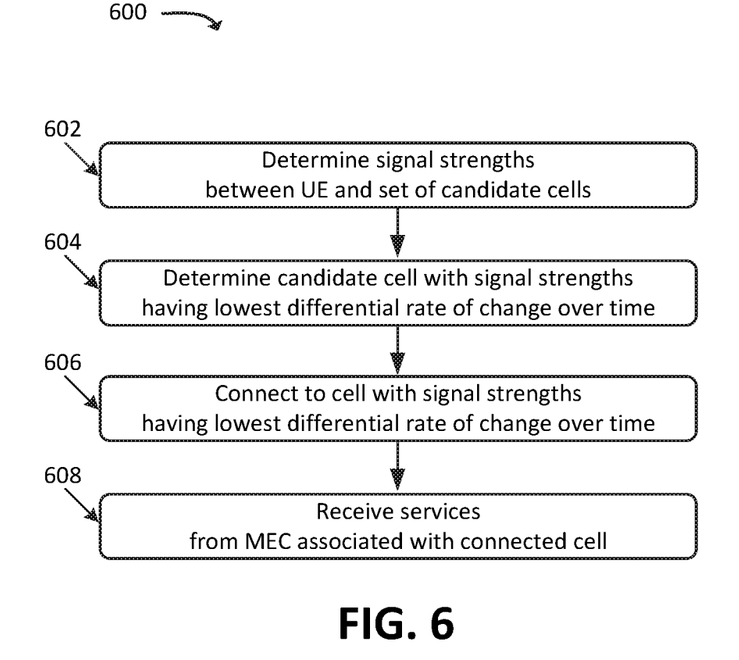
FIG. 6 illustrates an example process for connecting to a particular RU based on signal strengths between a UE and a set of candidate RUs, which may include one or more MRUs and one or more SRUs, in accordance with some embodiments.

FIG. 6 illustrates an example process 600 for connecting to a particular cell (e.g., MRU 107) based on signal strengths between a UE and a set of candidate RUs (e.g., which may include MRU 107 and one or more SRUs 109). In some embodiments, some or all of process 600 may be performed by UE 105 (e.g., by RU Selection Component 501). In some embodiments, one or more other devices may perform some or all of process 600, and/or one or more other components of UE 105 (e.g., in concert with, and/or in lieu of, RU Selection Component 501).

As shown, process 600 may include determining (at 602) signal strengths between UE 105 and a set of candidate cells. For example, as discussed above, UE 105 (e.g., RU Selection Component 501 and/or some other component of UE 105) may perform a cell scanning procedure in order to detect the present of one or more RUs (e.g., one or more MRUs 107 and/or one or more SRUs 109). For example, a particular RU may be detected by detecting one or more pilot signals, Master Information Blocks ("MIBs"), System Information Blocks ("SIBs"), or the like that are output (e.g., broadcasted) by the particular RU.

Process 600 may further include determining (at 604) a candidate cell with signal strengths having the lowest differential rate of change over time. For example, as similarly discussed above, UE 105 (e.g., RU Selection Component 501) may identify a cell with the steadiest signal strength between UE 105 and the cell. As discussed above, this determining may include identifying rates of change over time (e.g., average rates of change, median rates of change, etc.) of the signal strengths between UE 105 and the detected candidate cells. In some embodiments, UE 105 may compute an integral of a graph that reflects rates of change of signal strengths between UE 105 and the detected RUs at different times. As discussed above, UE 105 may select the cell exhibiting the lowest differential rate of change for UE 105 to connect to.

As discussed above, in some embodiments, UE 105 may select a cell for UE 105 based on one or more other factors in addition to, or in lieu of, differential rate of change of signal strengths. For example, UE 105 may use a different cell selection technique in situations where UE 105 is stationary (or is moving below a threshold speed), is not located near a roadway, is not located within proximity of one or more MRUs 107, etc.

Process 600 may additionally include connecting (at 606) to the selected cell with the signal strengths having the lowest differential rate of change over time. For example, UE 105 may perform an attach procedure in order to connect to the selected cell. As discussed above, the selected cell may, in some situations, be implemented by a particular MRU 107 (e.g., in situations where UE 105 is located in vehicle 101, which is traveling proximate to vehicle 103, which includes MRU 107).

Process 600 may also include receiving (at 608) services from a particular MEC 111 associated with the connected cell. For example, as discussed above, one or more RUs (e.g., MRU 107) may be associated with computing resources, such as a particular MEC 111. Once connected to a particular RU (e.g., MRU 107), UE 105 may communicate with a particular MEC 111 associated with the particular RU in order to receive services (e.g., autonomous driving services, voice call services, etc.) from MEC 111.

Figure 7:
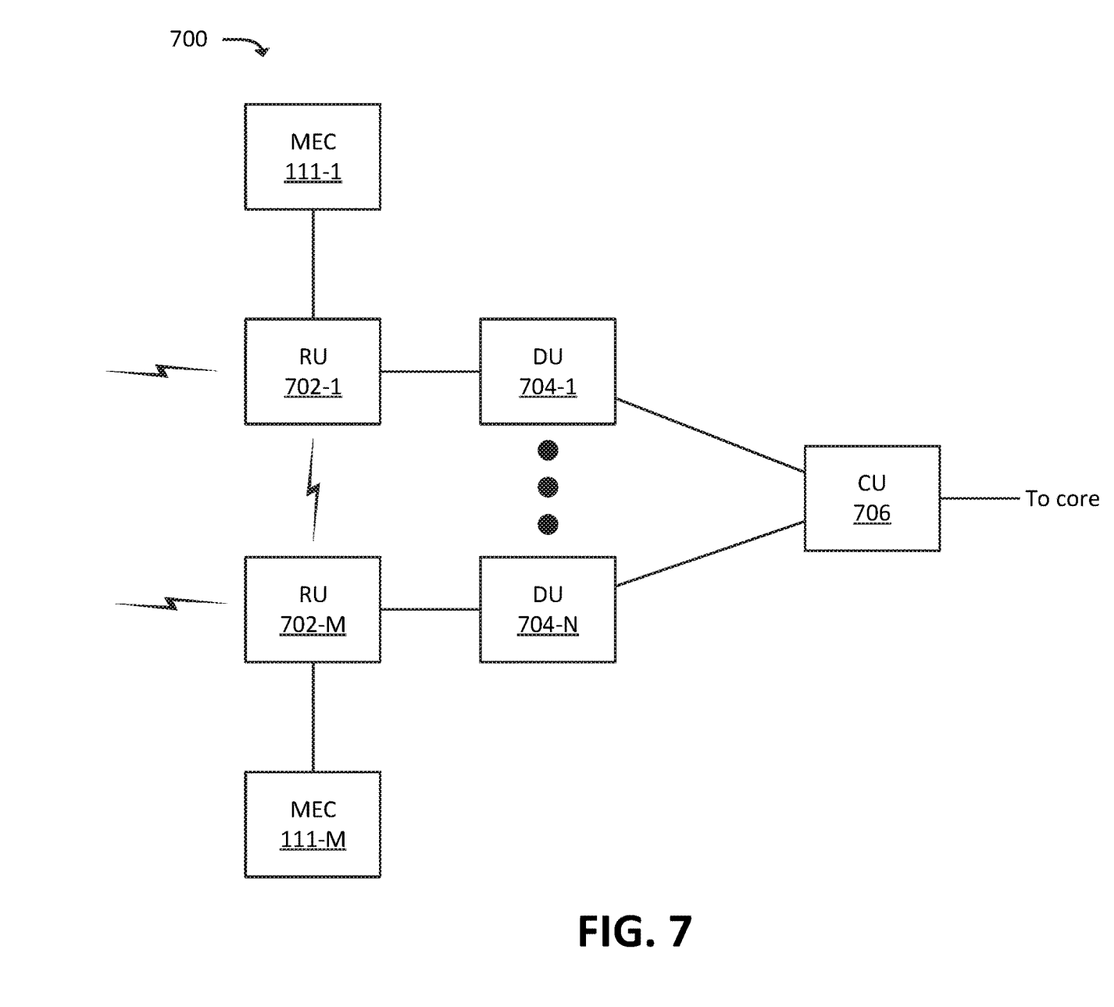
FIG. 7 illustrates an example arrangement of one or more RUs, in accordance with some embodiments.
Figure 8:
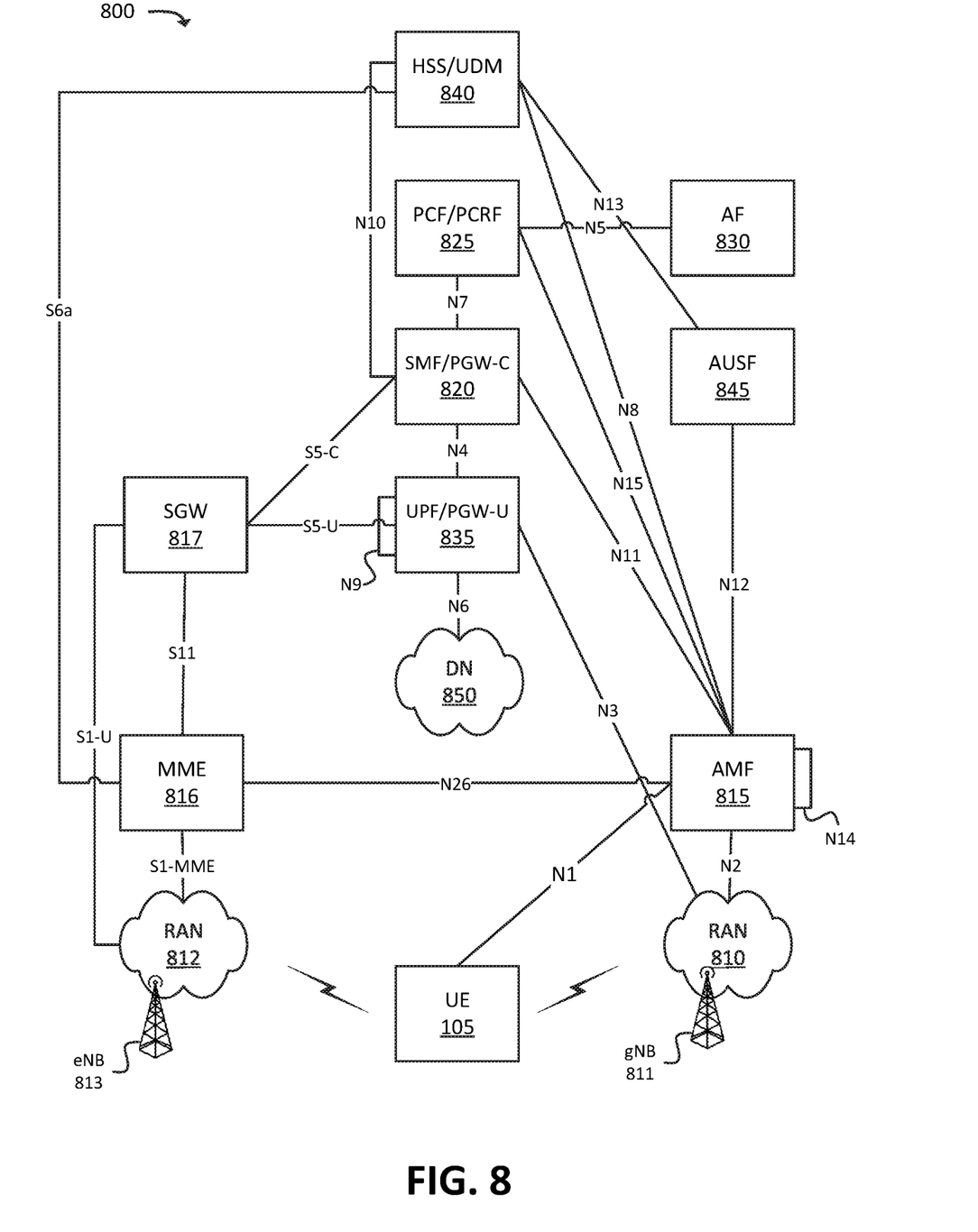
FIG. 8 illustrates an example environment in which one or more embodiments, described herein, may be implemented.

FIG. 7 illustrates an example Distributed Unit ("DU") network 700, which may be included in and/or implemented by a RAN to which UE 105 may connect, and/or may depict example components of a RAN to which UE 105 may connect. In some embodiments, a particular RAN may include one DU network 700. In some embodiments, a particular RAN may include multiple DU networks 700. In some embodiments, DU network 700 may correspond to a particular gNB of a 5G RAN. In some embodiments, DU network 700 may correspond to multiple gNBs of a 5G RAN. In some embodiments, DU network 700 may correspond to one or more other types of base stations of one or more other types of RANs. As shown, DU network 700 may include Control Unit ("CU") 706, one or more Distributed Units ("DUs") 704-1 through 704-N (referred to individually as "DU 704," or collectively as "DUs 704"), and one or more Remote Units ("RUs") 702-1 through 702-M (referred to individually as "RU 702," or collectively as "RUs 702").

CU 706 may communicate with a core of a wireless network (e.g., may communicate with one or more of the devices or systems described below with respect to FIG. 8, such as an Access and Mobility Management Function ("AMF") and/or a User Plane Function ("UPF")). In the uplink direction (e.g., for traffic from UEs 105 to a core network), CU 706 may aggregate traffic from DUs 704, and forward the aggregated traffic to the core network. In some embodiments, CU 706 may receive traffic according to a given protocol (e.g., Radio Link Control ("RLC")) from DUs 704, and may perform higher-layer processing (e.g., may aggregate/process RLC packets and generate Packet Data Convergence Protocol ("PDCP") packets based on the RLC packets) on the traffic received from DUs 704.

In accordance with some embodiments, CU 706 may receive downlink traffic (e.g., traffic from the core network) for a particular UE 105, and may determine which DU(s) 704 should receive the downlink traffic. DU 704 may include one or more devices that transmit traffic between a core network (e.g., via CU 706) and UE 105 (e.g., via a respective RU 702). DU 704 may, for example, receive traffic from RU 702 at a first layer (e.g., physical ("PHY") layer traffic, or lower PHY layer traffic), and may process/aggregate the traffic to a second layer (e.g., upper PHY and/or RLC). DU 704 may receive traffic from CU 706 at the second layer, may process the traffic to the first layer, and provide the processed traffic to a respective RU 702 for transmission to UE 105.

RU 702 may include hardware circuitry (e.g., one or more RF transceivers, antennas, radios, and/or other suitable hardware) to communicate wirelessly (e.g., via an RF interface) with one or more UEs 105, one or more other DUs 704 (e.g., via RUs 702 associated with DUs 704), and/or any other suitable type of device. In the uplink direction, RU 702 may receive traffic from UE 105 and/or another DU 704 via the RF interface and may provide the traffic to DU 704. In the downlink direction, RU 702 may receive traffic from DU 704, and may provide the traffic to UE 105 and/or another DU 704. RU 702 may be, or may include, MRU 107 and/or SRU 109.

RUs 702 may, in some embodiments, be communicatively coupled to one or more MECs 111. For example, RU 702-1 may be communicatively coupled to MEC 111-1, RU 702-M may be communicatively coupled to MEC 111-M, and so on. MECs 111 may include hardware resources (e.g., configurable or provisionable hardware resources) that may be configured to provide services and/or otherwise process traffic to and/or from UE 105, via a respective RU 702. For example, RU 702 may route some traffic, from UE 105, to MEC 111 instead of to a core network (e.g., via DU 704 and CU 706). MEC 111 may process the traffic, perform one or more computations based on the received traffic, and may provide traffic to UE 105 via an associated RU 702. In this manner, ultra-low latency services may be provided to UE 105, as traffic does not need to traverse DU 704, CU 706, and an intervening backhaul network between DU network 700 and the core network.

FIG. 8 illustrates an example environment 800, in which one or more embodiments may be implemented. In some embodiments, environment 800 may correspond to a 5G network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 105, RAN 810 (which may include one or more gNBs 811), RAN 812 (which may include one or more one or more eNBs 813), AMF 815, Mobility Management Entity ("MME") 816, Serving Gateway ("SGW") 817, Session Management Function ("SMF")/Packet Data Network ("PDN") Gateway ("PGW")-Control plane function ("PGW-C") 820, Policy Control Function ("PCF")/Policy Charging and Rules Function ("PCRF") 825, Application Function ("AF") 830, UPF/PGW-User plane function ("PGW-U") 835, Home Subscriber Server ("HSS")/Unified Data Management ("UDM") 840, Authentication Server Function ("AUSF") 845, and Data Network ("DN") 850.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 105 may include a computation and communication device, such as a wireless mobile communication device that is capable of communicating with RAN 810 and/or DN 850. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, or the like), a wearable device, a Mobile-to-Mobile ("M2M") device, or another type of mobile computation and communication device. UE 105 may send traffic to and/or receive traffic (e.g., user plane traffic) from DN 850 via RAN 810 and UPF/PGW-U 835. As discussed above, UE 105 may perform a cell selection (or reselection procedure) in the manner described above (e.g., based on differential rates of change of signal strengths of detected cells).

RAN 810 may be, or may include, a 5G RAN that includes one or more base stations (e.g., one or more gNBs 811), via which UE 105 may communicate with one or more other elements of environment 800. UE 105 may communicate with RAN 810 via an air interface (e.g., as provided by gNB 811). For instance, RAN 810 may receive traffic (e.g., voice call traffic, data traffic, messaging traffic, signaling traffic, etc.) from UE 105 via the air interface, and may communicate the traffic to UPF/PGW-U 835, and/or one or more other devices or networks. Similarly, RAN 810 may receive traffic intended for UE 105 (e.g., from UPF/PGW-U 835, AMF 815, and/or one or more other devices or networks) and may communicate the traffic to UE 105 via the air interface. As discussed above, RAN 810 may include one or more RUs 702, DUs 704, and/or CUs 706. In some embodiments, one or more gNBs 811 may include, and/or may be communicatively coupled to, one or more MECs 111.

RAN 812 may be, or may include, an LTE RAN that includes one or more base stations (e.g., one or more eNBs 813), via which UE 105 may communicate with one or more other elements of environment 800. UE 105 may communicate with RAN 812 via an air interface (e.g., as provided by eNB 813). For instance, RAN 810 may receive traffic (e.g., voice call traffic, data traffic, messaging traffic, signaling traffic, etc.) from UE 105 via the air interface, and may communicate the traffic to UPF/PGW-U 835, and/or one or more other devices or networks. Similarly, RAN 810 may receive traffic intended for UE 105 (e.g., from UPF/PGW-U 835, SGW 517, and/or one or more other devices or networks) and may communicate the traffic to UE 105 via the air interface. As discussed above, RAN 812 may include one or more RUs 702, DUs 704, and/or CUs 706. In some embodiments, one or more eNBs 813 may include, and/or may be communicatively coupled to, one or more MECs 111.

AMF 815 may include one or more devices, systems, Virtualized Network Functions ("VNFs"), etc., that perform operations to register UE 105 with the 5G network, to establish bearer channels associated with a session with UE 105, to hand off UE 105 from the 5G network to another network, to hand off UE 105 from the other network to the 5G network, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 105. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 105, from DN 850, and may forward the user plane data toward ULE 105 (e.g., via RAN 810, SMF/PGW-C 820, and/or one or more other devices). In some embodiments, multiple UPFs 835 may be deployed (e.g., in different geographical locations), and the delivery of content to UE 105 may be coordinated via the N9 interface (e.g., as denoted in FIG. 8 by the line marked "N9" originating and terminating at UPF/PGW-U 835). Similarly, UPF/PGW-U 835 may receive traffic from UE 105 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 105.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 105 may communicate, through DN 850, with data servers, other UEs 105, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 105 may communicate.

Figure 9:
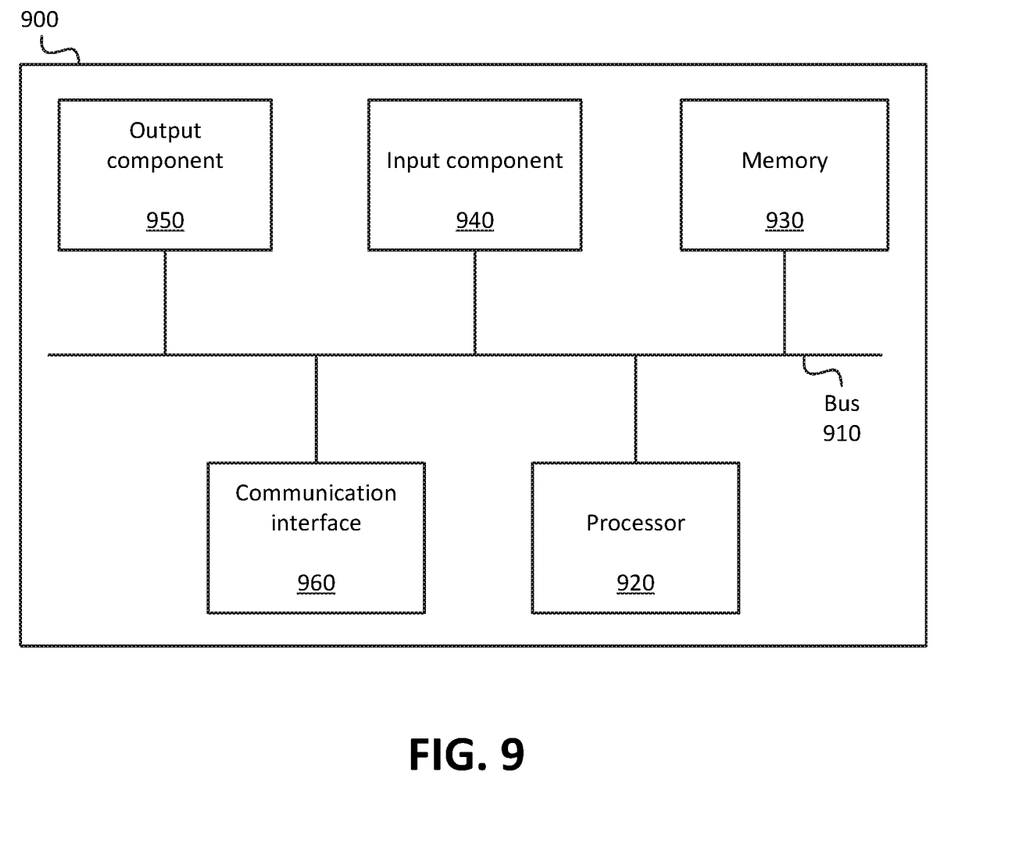
FIG. 9 illustrates example functional components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
identify a presence of a plurality of cells of a radio access network ("RAN") of a wireless telecommunications network based on wireless signals received from the plurality of cells;
determine, for each cell of the plurality of cells, a rate of change of signal strengths of the wireless signals received from the each cell, wherein determining the rate of change of signal strengths of the wireless signals received from each cell further includes at least one of:
determining a differential rate of change over time of the signal strengths of the wireless signals received from the each cell,
determining an average rate of change over time of the signal strengths of the wireless signals received from the each cell, or
determining a median rate of change over time of the signal strengths of the wireless signals received from the each cell;
select a particular cell, of the plurality of cells, based on the respective rates of change of the signal wireless signals received from the plurality of cells; and
connect to the selected particular cell.

2. The device of claim 1, wherein the wireless signals received from the plurality of cells include one or more pilot signals.

3. The device of claim 1, wherein selecting the particular cell includes determining that the particular cell includes at least one of:
a lowest differential rate of change over time of the signal strengths of the wireless signals received from the plurality of cells,
a lowest average rate of change over time of the signal strengths of the wireless signals received from the plurality of cells, or
a lowest median rate of change over time of the signal strengths of the wireless signals received from the plurality of cells.

4. The device of claim 1, wherein the one or more processors are further configured to:
determine a speed of the device; and
determine that the speed exceeds a threshold speed,
wherein the selection of the particular cell is further based on determining that the speed of the device exceeds the threshold speed.

5. The device of claim 1, wherein each cell, of the plurality of cells, is implemented by a respective Radio Unit ("RU") associated with the RAN.

6. The device of claim 5, wherein the plurality of cells include:
a first set of cells implemented by one or more stationary RUs, and
a second set of cells implemented by one or more mobile RUs that are mounted to one or more vehicles,
wherein the selected particular cell is implemented by a particular mobile RU.

7. The device of claim 1, wherein the plurality of cells include a first cell and a second cell, wherein the one or more processors are further configured to:
determine that a first signal strength of wireless signals received from the first cell during a first time window is higher than a second signal strength of wireless signals received from the second cell during the first time window; and
determine that a third signal strength of wireless signals received from the first cell during a second time window is lower than a fourth signal strength of wireless signals received from the second cell during the second time window,
wherein the selecting the particular cell based on the respective rates of change of the signal wireless signals received from the plurality of cells includes selecting the first cell based on the determined first, second, third, and fourth signal strengths.

8. A non-transitory computer-readable medium, storing a plurality of processor-executable instructions to:
identify a presence of a plurality of cells of a radio access network ("RAN") of a wireless telecommunications network based on wireless signals received from the plurality of cells;
determine, for each cell of the plurality of cells, a rate of change of signal strengths of the wireless signals received from the each cell, wherein determining the rate of change of signal strengths of the wireless signals received from each cell further includes at least one of:
determining a differential rate of change over time of the signal strengths of the wireless signals received from the each cell,
determining an average rate of change over time of the signal strengths of the wireless signals received from the each cell, or
determining a median rate of change over time of the signal strengths of the wireless signals received from the each cell;
select a particular cell, of the plurality of cells, based on the respective rates of change of the signal wireless signals received from the plurality of cells; and
connect to the selected particular cell.

9. The non-transitory computer-readable medium of claim 8, wherein the wireless signals received from the plurality of cells include one or more pilot signals.

10. The non-transitory computer-readable medium of claim 8, wherein selecting the particular cell includes determining that the particular cell includes at least one of:
a lowest differential rate of change over time of the signal strengths of the wireless signals received from the plurality of cells,
a lowest average rate of change over time of the signal strengths of the wireless signals received from the plurality of cells, or
a lowest median rate of change over time of the signal strengths of the wireless signals received from the plurality of cells.

11. The non-transitory computer-readable medium of claim 8, wherein the plurality of processor-executable instructions further include processor-executable instructions to:
determine a speed of a device executing the processor-executable instructions; and
determine that the speed exceeds a threshold speed,
wherein the selection of the particular cell is further based on determining that the speed of the device exceeds the threshold speed.

12. The non-transitory computer-readable medium of claim 8, wherein each cell, of the plurality of cells, is implemented by a respective Radio Unit ("RU") associated with the RAN.

13. The non-transitory computer-readable medium of claim 12, wherein the plurality of cells include:
- a first set of cells implemented by one or more stationary RUs, and
- a second set of cells implemented by one or more mobile RUs that are mounted to one or more vehicles,
- wherein the selected particular cell is implemented by a particular mobile RU.

14. The non-transitory computer-readable medium of claim 8, wherein the plurality of cells include a first cell and a second cell, wherein the plurality of processor-executable instructions further include processor-executable instructions to:
- determine that a first signal strength of wireless signals received from the first cell during a first time window is higher than a second signal strength of wireless signals received from the second cell during the first time window; and
- determine that a third signal strength of wireless signals received from the first cell during a second time window is lower than a fourth signal strength of wireless signals received from the second cell during the second time window,
- wherein the selecting the particular cell based on the respective rates of change of the signal wireless signals received from the plurality of cells includes selecting the first cell based on the determined first, second, third, and fourth signal strengths.

15. A method, comprising:
- identifying a presence of a plurality of cells of a radio access network ("RAN") of a wireless telecommunications network based on wireless signals received from the plurality of cells;
- determining, for each cell of the plurality of cells, a rate of change of signal strengths of the wireless signals received from the each cell, wherein determining the rate of change of signal strengths of the wireless signals received from each cell further includes at least one of:
  - determining a differential rate of change over time of the signal strengths of the wireless signals received from the each cell,
  - determining an average rate of change over time of the signal strengths of the wireless signals received from the each cell, or
  - determining a median rate of change over time of the signal strengths of the wireless signals received from the each cell;
- selecting a particular cell, of the plurality of cells, based on the respective rates of change of the signal wireless signals received from the plurality of cells; and
- connecting to the selected particular cell.

16. The method of claim 15, wherein the wireless signals received from the plurality of cells include one or more pilot signals.

17. The method of claim 15, wherein selecting the particular cell includes determining that the particular cell includes at least one of:
- a lowest differential rate of change over time of the signal strengths of the wireless signals received from the plurality of cells,
- a lowest average rate of change over time of the signal strengths of the wireless signals received from the plurality of cells, or
- a lowest median rate of change over time of the signal strengths of the wireless signals received from the plurality of cells.

18. The method of claim 15, further comprising:
- determining a present speed; and
- determining that the present speed exceeds a threshold speed,
- wherein the selection of the particular cell is further based on determining that the present speed exceeds the threshold speed.

19. The method of claim 15, wherein each cell, of the plurality of cells, is implemented by a respective Radio Unit ("RU") associated with the RAN,
- wherein the plurality of cells include:
  - a first set of cells implemented by one or more stationary RUs, and
  - a second set of cells implemented by one or more mobile RUs that are mounted to one or more vehicles, and
- wherein the selected particular cell is implemented by a particular mobile RU.

20. The method of claim 15, wherein the plurality of cells include a first cell and a second cell, the method further comprising:
- determining that a first signal strength of wireless signals received from the first cell during a first time window is higher than a second signal strength of wireless signals received from the second cell during the first time window; and
- determining that a third signal strength of wireless signals received from the first cell during a second time window is lower than a fourth signal strength of wireless signals received from the second cell during the second time window,
- wherein the selecting the particular cell based on the respective rates of change of the signal wireless signals received from the plurality of cells includes selecting the first cell based on the determined first, second, third, and fourth signal strengths.

* * * * *